United States Patent [19]

Oikawa

[11] Patent Number: 5,430,638
[45] Date of Patent: Jul. 4, 1995

[54] LOW NOISE TYPE CONVERTER WITH COMPLEMENTARY TRANSISTORS

[75] Inventor: Kazumasa Oikawa, Iida, Japan

[73] Assignee: Asia Electronics Ind. Co., Ltd., Nagano, Japan

[21] Appl. No.: 220,529

[22] Filed: Mar. 31, 1994

[30] Foreign Application Priority Data

Sep. 20, 1993 [JP] Japan ................... 5-255242

[51] Int. Cl.⁶ ............................................. H02M 3/24
[52] U.S. Cl. ........................................ 363/98; 363/132
[58] Field of Search ............... 363/98, 71, 132, 43; 307/83

[56] References Cited

U.S. PATENT DOCUMENTS

| 3,887,861 | 6/1975 | Anzai et al. | |
|---|---|---|---|
| 4,626,983 | 12/1986 | Harada et al. | 363/98 X |
| 5,146,147 | 9/1992 | Wills et al. | 363/98 X |
| 5,218,522 | 6/1993 | Phelps et al. | 363/71 X |

FOREIGN PATENT DOCUMENTS

| 0314386 | 5/1989 | European Pat. Off. |
| 833896 | 5/1960 | United Kingdom . |
| 1111646 | 5/1968 | United Kingdom . |

*Primary Examiner*—Thomas M. Dougherty
*Assistant Examiner*—E. To
*Attorney, Agent, or Firm*—Michael D. Bednarek; Marks & Murase

[57] ABSTRACT

A low noise type converter comprising an input transformer having first and second terminals for inputting a repetitive waveform signal. First and second series circuits are provided, each having one end connected respectively to the first and second terminals on the secondary side of the input transformer. A first circuit of serially connected complementary transistors have their bases or gates connected through a common node to the first series circuit. Similarly, a second circuit of serially connected complementary transistors have their bases or gates connected through a common node to the second series circuit. An output transformer has a first terminal on its primary side connected to a common node of the first complementary transistors and has a second terminal on its primary side connected to a common node of the second complementary transistors. Because the low noise type converter includes two complementary transistor circuits having no simultaneous 'ON' state, the rising and falling edges of the output formation waveform become smooth and the external noises are diminished. The level of the noise can be lowered to 1/10 of the noise level of existing devices. Thus, the converter can be used as a power amplifier in a switching regulator, for example, as a DC stabilizing power-source and as an DC-AC inverter for a dimmer.

9 Claims, 5 Drawing Sheets

LOW NOISE TYPE CONVERTER WITH COMPLEMENTARY TRANSISTORS

BACKGROUND OF THE INVENTION

1. Field of the Invention

The present invention relates to a low noise converter which smoothly power amplifies the rising edges and the falling edges of an input signal against an input with a repetitive waveform such as a rectangular waveform or a sine waveform etc. and which outputs the power amplified and smooth signal. The low noise converter of the present invention is available for power amplifiers like a switching regulator as one of DC stabilizing power sources, a DC-AC inverter for a dimmer, a converter for a back light of liquid crystal displays, an inverter applied the switching of a cathodic discharge lamp etc..

2. Description of the Prior Art

Conventionally, a switching regulator or the like outputs a predetermined DC output through ON/OFF switching, controlling, stabilizing, rectifying and smoothing a high voltage and a large current at a high speed, differently from the series regulator system of the power source. For this reason, various higher harmonic components are included in a voltage waveform and a current waveform, and many noise components are generated in the transient states at the ON/OFF switching. The level of a noise is 50~200 [mV] peak to peak value in general. These noise components appear as a signal noise appearing in a DC output signal, a back noise feedback into the input signal and also a radiant noise radiated in the air, and this results in one of the weak points of the switching regulator.

In order to eliminate the above noises, it needs a filter inserted in the input side or the output side, or a condenser arranged within the case. Further, a copper foil pattern on a printed circuit board or wiring of leading wires must be studied. Accordingly, the number of parts become large and the wiring operations are hard to homogenize, thus the operation efficiency has been lowered, and the manufacturing cost has been increased.

On the other hand, a converter with a Royer circuit which comprises a less number of parts and has a relatively simple circuit structure is well known. Nevertheless, the Royer circuit has a state wherein two switching transistors are simultaneous "ON", therefore, very large turn-on loss and cross-over loss-take place, besides, the available input frequencies could not cope with high-frequency waves.

Moreover, in the conventional DC-AC inverter, since an AC sine waveform is produced from a DC current by using a resonance circuit, the voltage fluctuation owing to a load has been large.

As the generation of the noise above mentioned is caused by a sudden rise or fall of a produced and power amplified waveform, it can be supposed that the fluctuation makes itself smooth to control the rapid varying.

SUMMARY OF THE INVENTION

In view of the above-described problems of the conventional prior art, the present invention is aimed at providing a high efficiency and a low noise inverter of which load fluctuation of the output voltage is small. External noises are diminished by making the rising and falling edges of the output formation waveform smooth, and complementary circuits which have fie simultaneous "ON" state are used.

According to one aspect of the present invention, for achieving the objects described above, there is provided a low noise converter which comprises an input transformer for inputting a repetitive waveform signal, a first series circuit which is connected to a first terminal on a secondary side of the input transformer holding bases or gates in common and which connects with first complementary transistors in series, a second series circuit which is connected to a second terminal on the secondary side of the input transformer holding bases or gates in common and which connects with second complementary transistors in series, and an output transformer connected the first terminal on the primary side thereof to a common node of the first complementary transistors on the first series circuit and connected the second terminal on the primary side thereof to a common node of the second complementary transistors on the second series circuit.

The nature, principle and utility of the invention will become more apparent from the following detailed description when read in conjunction with the accompanying drawings.

DESCRIPTION OF THE PREFERRED EMBODIMENTS

The embodiments of the present invention will be explained with reference to the figures.

Figure 1:
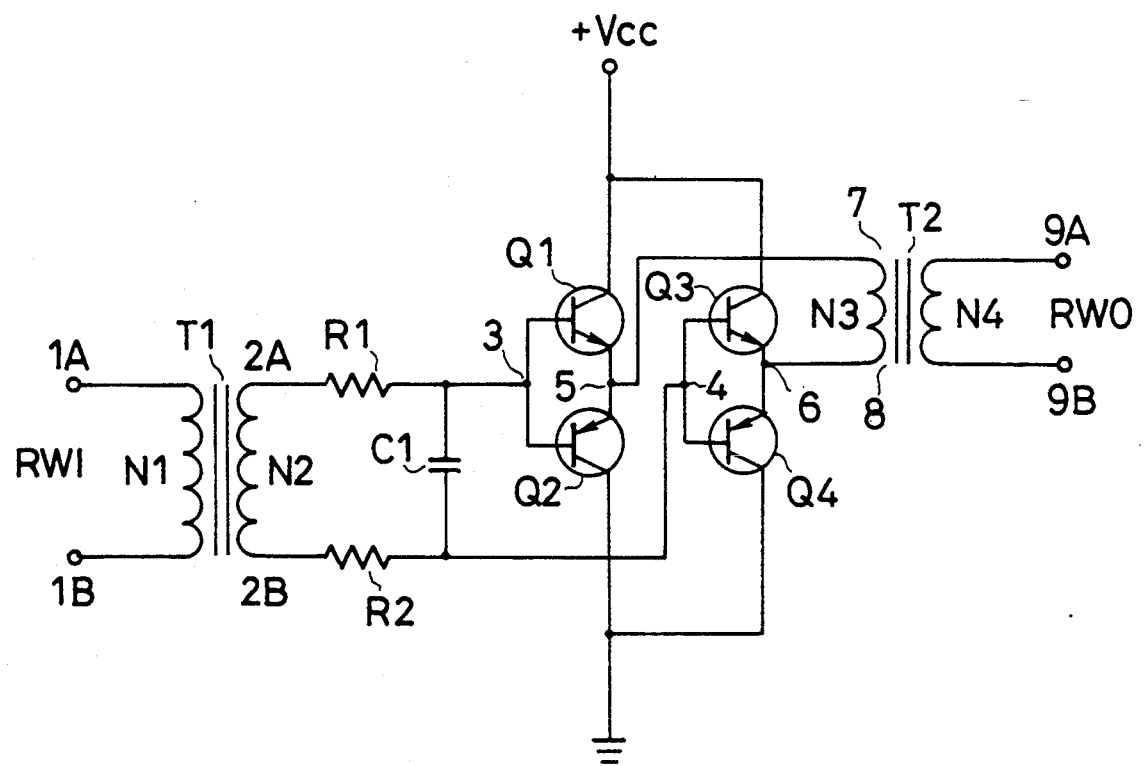
FIG. 1 is a fundamental circuit diagram showing an example of the present invention.

FIG. 1 is a fundamental circuit diagram showing an embodiment of the low noise converter according to the present invention, including an input transformer T1 which inputs the repetitive waveform signal RWI such as a rectangular waveform or a sine waveform etc. through terminals 1A, 1B on the primary side. The input transformer T1 is wound at a step-up ratio (or step-down ratio) N1:N2, a terminal 2A on the secondary side thereof is connected to a resistor R1 for current limiting and is further connected to a common-base terminal 3 on the first series circuit composed of complementary transistors Q1 and Q2. A terminal 2B on the secondary side of the input transformer T1 is connected to a resistor R2 for current limiting and is further connected to a common-base terminal 4 on the second series circuit composed of complementary transistors Q3 and Q4. A smoothing condenser C1 is connected between the common-base terminals 3 and 4, the first and the second series circuits have the same constitutions and are connected in parallel, having a common nodes 5 and 6 respectively, which join the emitters of PNP-type transistors Q1 and Q3 with the emitters of the NPN-type tansistors Q2 and Q4 respectively, the collectors of the transistors Q1 and Q3 are applied a DC bias voltage $+V_{cc}$, and those of the transistors Q2 and Q4 are grounded on O [V]. A common node 5 on the first series circuit is connected to a terminal 7 on the primary side of an output transformer T2, and the common node 6 on the second series circuit is connected to a terminal 8 on the primary side of the output transformer T2, so that terminals 9A and 9B on the secondary side of the output transformer T2 output a repetitive waveform signal RWO smoothly power amplified. Here, the turn ratio N3:N4 of the output-transformer T2 is determined in accordance with a specified output voltage.

In the above constitution, the operation will be explained with reference to FIG. 2 to FIGS. 4A to 4D.

Figures 4A, 4B, 4C, 4D:
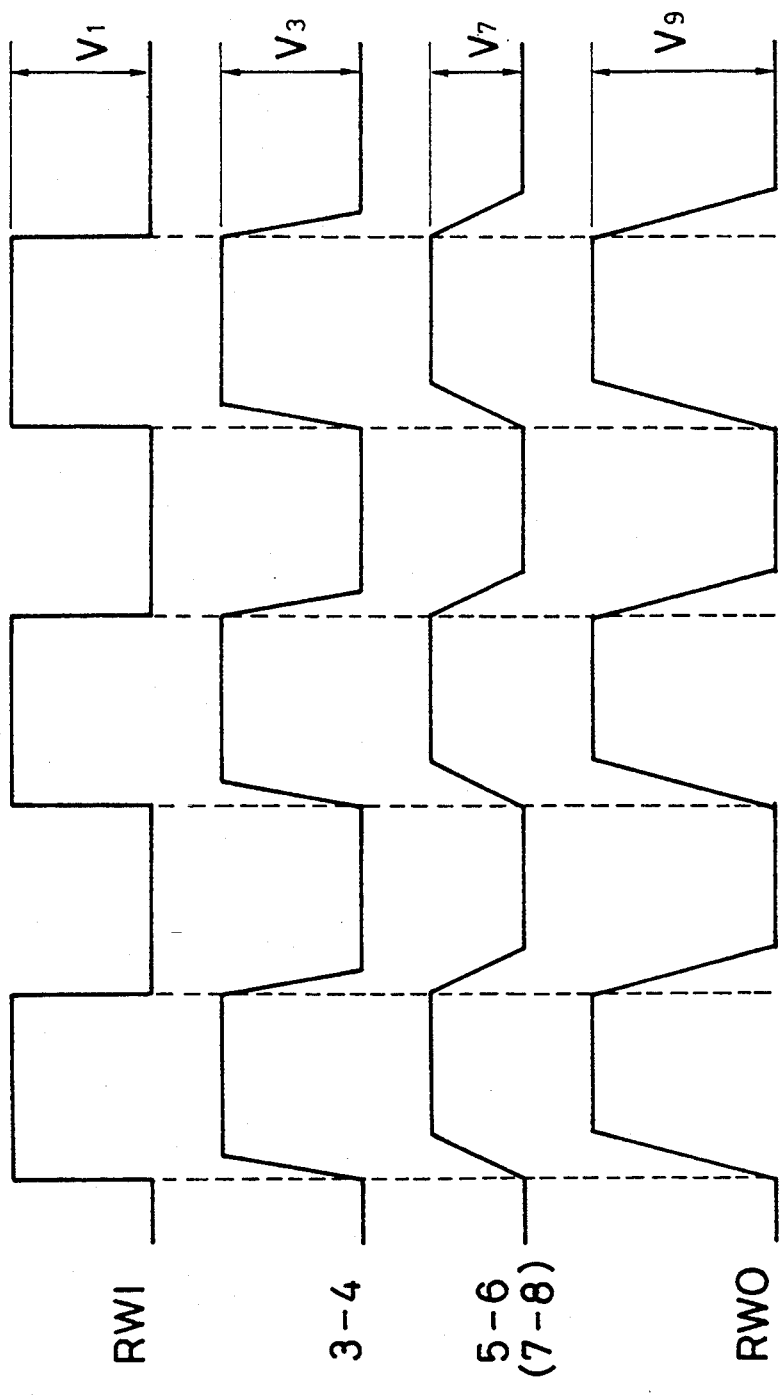
FIGS. 4A to 4D are diagrams of waveforms at each section showing an example of the operation.

When a rectangular repetitive waveform signal RWI (input voltage V1) with a constant frequency and sudden rises and falls as shown in FIG. 4A is inputted to the terminals 1A and 1B, a rectangular, alternately sign changed repetitive waveform signal with smooth rises and falls, as shown in FIG. 4B is applied between the common-base terminal 3 of complementary the transistors Q1 and Q2 and the common-base terminal 4 of the complementary transistors Q3 and Q4, according to the constants of the input transformer T1, the resistors R1 and R2 and the condenser C1.

Figure 2:
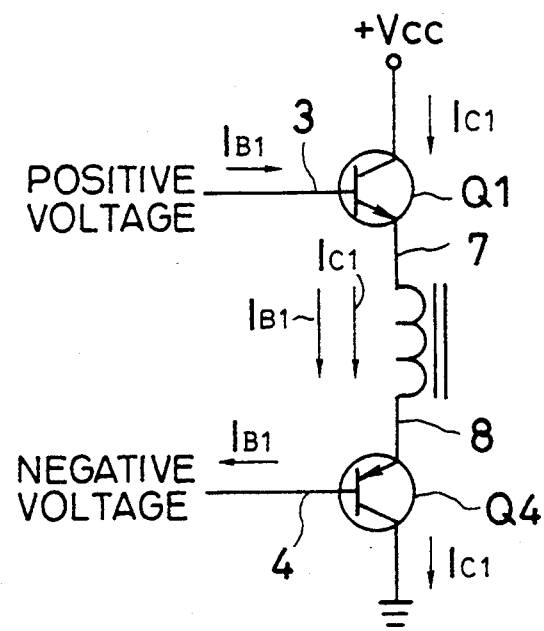
FIG. 2 is a circuit diagram showing the operation principle of the present invention.
Figure 3:
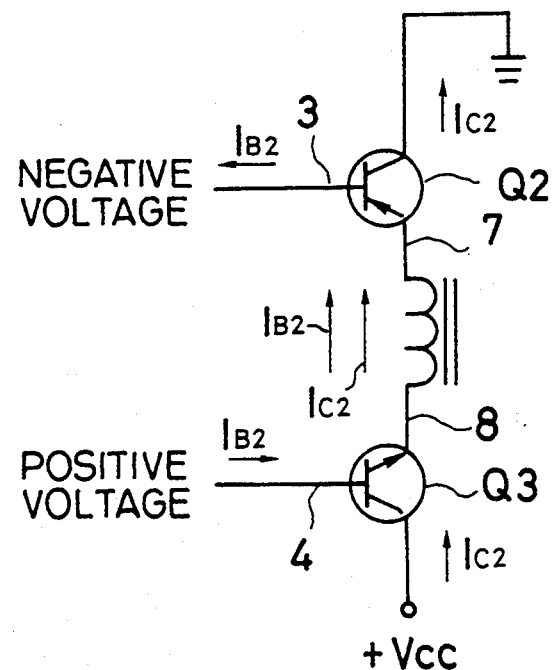
FIG. 3 is a circuit diagram showing another the operation principle of the present invention.

FIG. 2 and FIG. 3 are the circuit diagrams showing the operation principle of the present invention. In FIG. 2, when a positive voltage is applied to the common-base terminal 3 and a negative voltage is applied to the common-base terminal 4, a current IB1 flows from the base and emitter of the transistor Q1 into the common-base terminal 4, through the terminals 7 and 8 on the primary side of the output transformer T2. Further, as shown in FIG. 3, when a negative voltage is applied to the common-base terminal 3 and a positive voltage is applied to the common-base terminal 4, a current IB2 flows from the base and emitter of the transistor Q3 into the common-base terminal 3, through the terminals 8 and 7 and the emitter of the transistor Q2.

If the transistors Q1 and Q3 have the same characteristics with the transistors Q2 and Q4 respectively, an equation expressed by a below numerical equation (1) is satisfied.

$$IB1 = -IB2 \quad (1)$$

Expressing an applied voltage to the common-base terminals 3 and 4 as a voltage V3, the descending voltage between the base and the emitter of the transistors Q1 and Q2 as a voltage VBE1 and the descending voltage between the base and the emitter of the transistors Q2 and Q4 as a voltage VBE2, the voltage V7 appeared at the terminals 7 and 8 is obtained from an equation expressed by a below numerical equation 2 and an output voltage is nearly proportional to the input voltage V3, as shown in FIG. 4C.

$$V7 = V3 - (VBE1 + VBE2) \quad (2)$$

Further, when a load circuit is connected to the terminals 9A and 9B, only in case that the current IB1 or IB2 flows in the transistors Q1 and Q4 or the transistors Q2 and Q3 respectively, the transistors Q1 and Q4 and the transistors Q2 and Q3 take ON-state respectively, and the currents IC1 and IC2, which are in-phase with the currents IB1 and IB2 respectively, flow from the positive bias power source $+V_{cc}$ to the transistors Q1 and Q4 and the transistors Q2 and Q3 respectively.

Then, a relations of a numerical formula (3) leads to that of a numerical equation (4).

$$IC1 = -IC2 \quad (3)$$

$$IB1 + IC1 = -(IB2 + IC2) \quad (4)$$

On account of a relation expressed by a numerical relation (5), if the bias power source $+V_{cc}$ is a constant, it will be able to power amplify in accordance with a load capacity, depending on the currents IB1 and IB2 to be set up or changed into a suitable operating current within an absolute maximum rating.

$$IC1 > IB2, IC2 > IB2 \quad (5)$$

The waveform signal RWO appeared at the terminals 9A and 9B of the output transformer T2 is shaped a power amplified waveform of smooth rising and falling, so that the line noise, the radiant noise etc. can be greatly diminished. Further, because of no simultaneous "ON" state occurs in the complementary circuits, the frequency of the input voltage can be high frequency.

Figure 5:
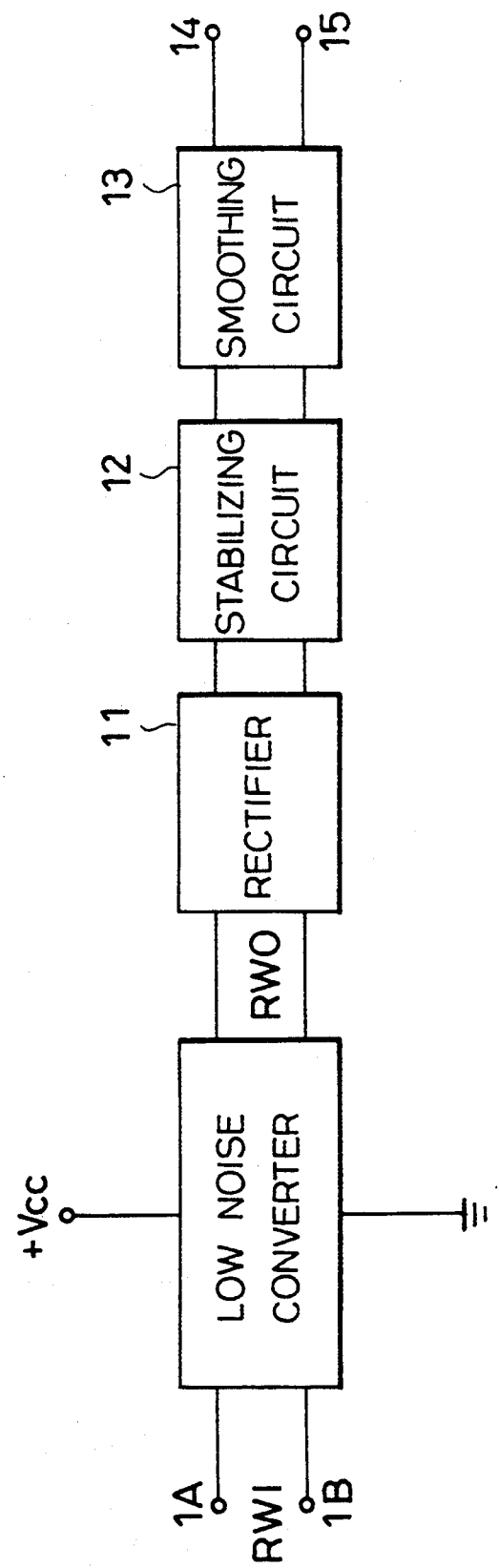
FIG. 5 is a block diagram showing an example of the configuration of a DC-AC inverter.

Also, by connecting a rectifier 11, a stabilizing circuit 12 and a smoothing circuit 13 with the low noise converter of the present invention as shown in FIG. 5, a DC stabilized output insulated the input-output can be obtained. Also, it can be used as a low noise DC-AC inverter with a small lead fluctuation, which makes an output of the output transformer T2 into a high voltage.

Figure 6:
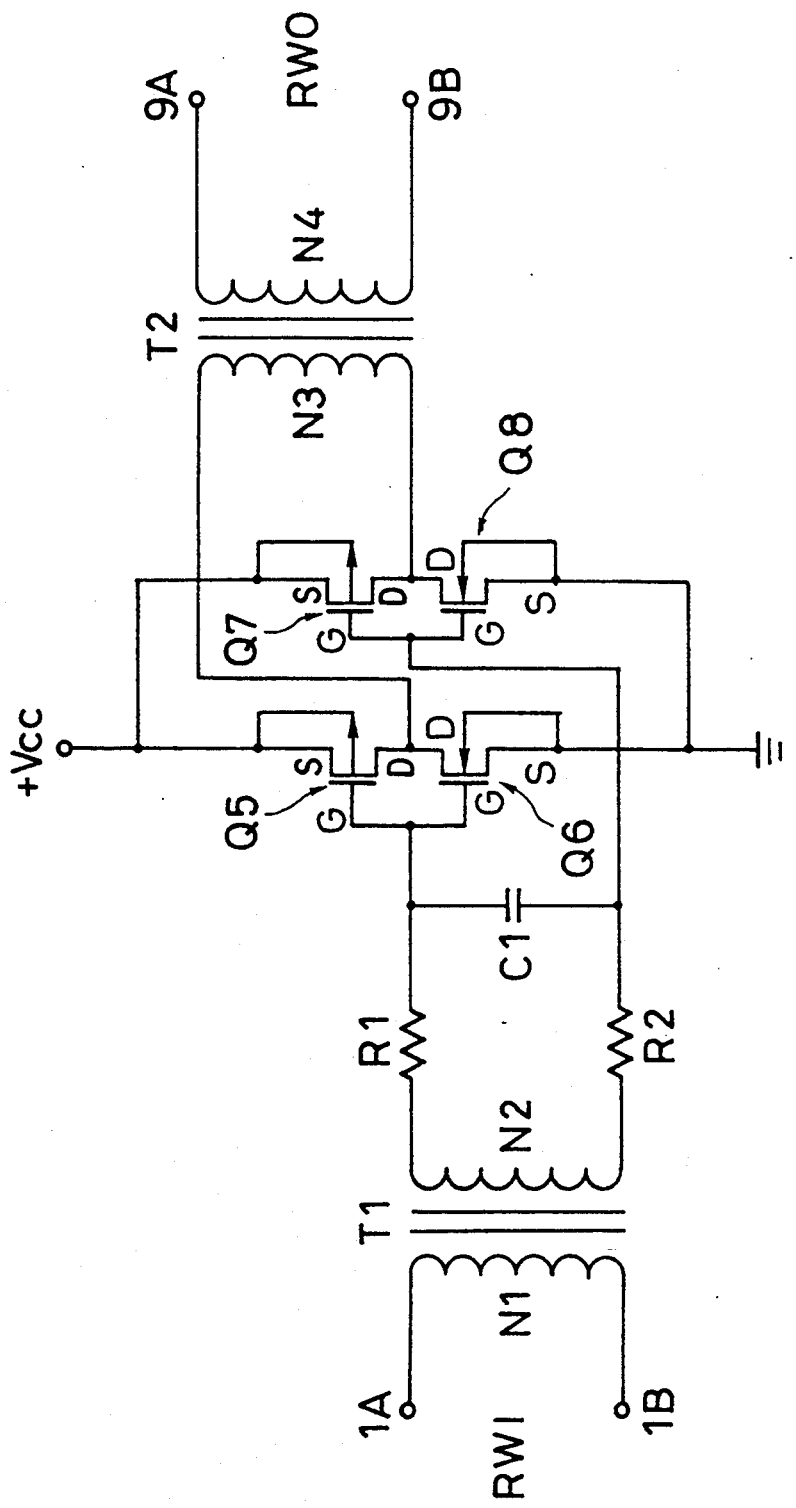
FIG. 6 is a circuit diagram showing another embodiment of the present invention.

Though in the above embodiment, the complementary circuit composed of the NPN-type transistor and PNP-type transistor is adopted, it can also be composed of a pair of field effect transistors (FETs). FIG. 6 shows a circuit diagram of such an embodiment in correspondence with FIG. 1, each complementary circuits are composed of enhancement P-channel MOS-FETs Q5 and Q7 and enhancement N-channel MOS-FETs Q6 and Q8, respectively. Moreover, although the above embodiments take a discrete circuit structure, the complementary circuits etc. can be integrated in an IC, and they can be made into a module, including the transformers. Further, although FIG. 4 shows an example of a rectangular waveform, the present invention can be applied to a sine waveform, a triangular waveform or the like as well.

As it can be understood from the above explanation, according to the low noise converter of the present invention, a low noise output signal can be obtained because the rising and falling edges at the power amplifying section are smooth, the higher harmonic components become small due to the smooth output waveform, and effective measures for EMI can be made to diminish the radiant noise toward the outside. At the embodiment shown in FIG. 1, the level of the noise became 5-20 [mV] by peak to peak value, which is almost 1/10 of the value of existing levels.

The complementary transistors have no simultaneous "ON" state, so that they cause little exothermic losses anti have high efficiency, and as high frequency waves are available, the components or the apparatus can be compacted together. Further, as the transformer is inserted between the input terminals and output terminals, they are insulated each other and a spike voltage does not overlap beyond the DC bias voltage, so that breakages of the transistors can be prevented. Because few parts are needed, production is cheap. Furthermore, when it is used as a DC-AC inverter, a high voltage with a low noise and a small load fluctuation can be obtained.

It should be understood that many modifications and adaptations of the invention will become apparent to those skilled in the art and it is intended to encompass such obvious modifications and changes in the scope of the claims appended hereto.

What is claimed is:

1. A low noise type converter comprising:
   an input transformer having first and second terminals provided on a secondary side for inputting a repetitive waveform signal;
   a first series circuit connected in series between said first terminal on the secondary side of the input transformer and a first common node;
   a first circuit of serially connected first complementary transistors, wherein said bases or gates of said first complementary transistors are connected to said first common node;
   a second series circuit connected in series between said second terminal on the secondary side of the input transformer and a second common node;
   a second circuit of serially connected second complementary transistors, wherein said bases or gates of said second complementary transistors are connected to said second common node; and
   an output transformer having first and second terminals provided on a primary side, wherein said first circuit of serially connected first complementary transistors has a third common node connected to said first terminal on the primary side of said output transformer, and said second circuit of serially connected second complementary transistors has a fourth common node connected to the second terminal on the primary side of said output transformer, whereby a smooth repeated waveform signal can be outputted from terminals on the secondary side of the output transformer.

2. A low noise type converter according to claim 1, further comprising a rectifier circuit, a DC stabilizing circuit and a smoothing circuit connected with the terminals on the secondary side of the output transformer, whereby an expected DC stabilized voltage can be obtained.

3. A low noise type converter according to claim 1, which comprises a DC-AC inverter for making the secondary side of the output transformer into high voltage.

4. A low noise type converter according to claim 1, wherein the input transformer is a step-up transformer or a step-down transformer.

5. A low noise type converter according to claim 1, wherein said first series circuit comprises a first current-limiting resistance, and said second series circuit comprises a second current-limiting resistance.

6. A low noise type converter according to claim 1, wherein the first complementary transistors and the second complementary transistors each comprise a pair of complementary field-effect transistors.

7. A low noise type converter according to claim 5, wherein the first complementary transistors, the second complementary transistors, the first current-limiting resistance and second current-limiting resistance are integrated in an IC.

8. A low noise type converter according to claim 6, wherein the pairs of complementary field-effect transistors are integrated in an IC.

9. A low noise converter according to claim 1, wherein said first complementary transistors and said second complementary transistors are integrated in an IC.

* * * * *